(12) United States Patent
Auerbach

(10) Patent No.: US 6,686,002 B2
(45) Date of Patent: Feb. 3, 2004

(54) SEALING STRIP COMPOSITION

(75) Inventor: Melvin Auerbach, Twinsburg, OH (US)

(73) Assignee: Seal-OPS, LLC, Tenafly, NJ (US)

( * ) Notice: Subject to any disclaimer, the term of this patent is extended or adjusted under 35 U.S.C. 154(b) by 126 days.

(21) Appl. No.: 09/757,614

(22) Filed: Jan. 11, 2001

(65) Prior Publication Data

US 2002/0091186 A1 Jul. 11, 2002

(51) Int. Cl.$^7$ ............................. E06B 3/263; E06B 3/28; B32B 17/06; B32B 25/04; C08L 15/02; C03C 27/00
(52) U.S. Cl. .................. 428/34; 428/440; 428/492; 428/497; 428/913; 524/261; 156/109
(58) Field of Search .......................... 428/34, 440, 492, 428/497, 913; 524/261; 156/109

(56) References Cited

U.S. PATENT DOCUMENTS

| | | | |
|---|---|---|---|
| 3,654,005 A | 4/1972 | Higgins et al. ............. 156/108 |
| 3,771,276 A | 11/1973 | Stewart et al. .............. 52/172 |
| 4,109,431 A | 8/1978 | Mazzoni et al. ............. 52/172 |
| 4,145,237 A | 3/1979 | Mercier et al. ............. 156/107 |
| 4,198,254 A | 4/1980 | Laroche et al. ............. 156/107 |
| 4,215,164 A | 7/1980 | Bowser ...................... 428/34 |
| 4,348,435 A | 9/1982 | Mistrick et al. ............. 428/34 |
| 4,431,691 A | 2/1984 | Greenlee .................... 428/34 |
| 4,440,829 A | 4/1984 | Gerace et al. .............. 428/343 |
| 4,476,264 A | * 10/1984 | Graziano et al. ........... 523/435 |
| 4,614,676 A | 9/1986 | Rehfeld ..................... 428/34 |
| 4,622,249 A | 11/1986 | Bowser ...................... 428/34 |
| 4,817,354 A | 4/1989 | Bayer ........................ 52/302 |
| 4,904,732 A | 2/1990 | Iwahara et al. ............. 525/100 |
| 4,942,704 A | 7/1990 | King .......................... 52/171 |
| 4,952,430 A | 8/1990 | Bowser et al. .............. 428/34 |
| 4,994,309 A | 2/1991 | Reichert et al. ............. 428/34 |
| 5,033,249 A | 7/1991 | Scheeren et al. ............. 52/790 |
| 5,088,258 A | 2/1992 | Schield et al. .............. 52/398 |
| 5,114,658 A | 5/1992 | Katsaros ..................... 264/537 |
| 5,162,445 A | 11/1992 | Powers et al. ............. 525/333.4 |
| 5,177,916 A | 1/1993 | Misera et al. ............... 52/172 |
| 5,254,377 A | 10/1993 | Lingermann ............... 428/34.1 |
| 5,484,477 A | 1/1996 | George et al. .............. 106/499 |
| 5,632,122 A | 5/1997 | Spinks ........................ 52/172 |
| 5,786,414 A | 7/1998 | Chikuni et al. ............. 524/413 |
| 5,851,609 A | 12/1998 | Baratuci et al. ............. 428/34 |
| 5,855,972 A | 1/1999 | Kaeding ..................... 428/34 |
| 5,859,114 A | * 1/1999 | Davis et al. ................. 524/490 |
| 5,959,049 A | * 9/1999 | Powers et al. .............. 526/185 |
| 6,009,910 A | * 1/2000 | Shibano ...................... 138/126 |
| 6,015,525 A | * 1/2000 | Patitsas et al. .............. 264/315 |
| 6,160,045 A | * 12/2000 | Hoxmeier et al. ........... 524/261 |
| 6,235,356 B1 | * 5/2001 | Shibuya et al. .............. 428/34 |
| 6,491,992 B1 | * 12/2002 | Koizumi et al. ............. 428/34 |
| 6,492,028 B2 | * 12/2002 | Kotera et al. ............. 428/424.8 |

FOREIGN PATENT DOCUMENTS

GB 1384127 8/1972

* cited by examiner

Primary Examiner—Harold Pyon
Assistant Examiner—Chris Bruenjes
(74) Attorney, Agent, or Firm—Arnold D. Litt

(57) ABSTRACT

The invention relates to a composition adapted for use as a sealing strip in the manufacture of insulating structures. The composition includes a polymeric base material, a cross linking agent, an adhesion promoter and less than 10% tackifier. The invention further relates to an insulating structure including first and second panes with the sealing strip positioned therebetween.

14 Claims, 1 Drawing Sheet

SEALING STRIP COMPOSITION

BACKGROUND OF THE INVENTION

1. Field of the Invention

The invention relates to a sealing strip used in the construction of insulating, double pane structures. More particularly, the invention relates to a sealing strip composition comprising of a polymeric base material(s), a cross linking agent, an adhesion promoter, fillers, molecular sieves, plasticizers and less than 10% tackifier.

2. Description of the Prior Art

Various sealing structures have been developed for use in the fabrication of insulating glass structures. These sealing structures are generally positioned between adjacent panes and act to maintain the panes in a spaced relationship. The sealing structure must also prevent the passage of undesirable materials within the space defined between the adjacent panels. The passage of, for example, water vapor, leads to the formation of undesirable condensation between the panes. Once such condensation has made its way within the space between the panes, the double pane becomes unuseable.

With this in mind, a sealing structure must be optimized to maintain the spacing between the panes, adhere to the surface of the panes so as to create a barrier to the passage of vapor between the sealing structure and the pane, and be substantially impermeable to vapor through the sealing structure itself. A variety of sealing structures are known to exist, but each is known to possess shortcomings requiring modification of the base sealing material through the inclusion of various structural additives such as spacers and vapor barriers.

For example, and with reference to U.S. Pat. No. 5,855,972 to Konrad H. Kaeding, a sealant strip for use in the fabrication of insulating glass is disclosed. In the '972 patent, Kaeding provides examples of using a deformable sealant strip to manufacture insulating glass for use in window systems. Although he makes some strides in overcoming previous deficiencies in analogous systems, he fails to completely resolve the issues of simplicity, resistance to compression, good adhesion and ease of manufacture. He gives many examples of "grafting polymers onto the backbone of the Exxon Exxpro polymers", but he does not obtain the desired product without further manipulation. However, Kaeding was not able to resolve all issues and obtain the optimum synergy.

Kaeding claims to provide excellent adhesion, but offers no data. He claims to have a system that is resistant to compression, but uses "staples" within the sealant strip to maintain the desired dimensions and to prevent compression. In addition, he discusses the use of plastic and/or metal vapor barriers to prevent the ingress of water and other external materials into the cavity of the insulating glass unit. He also uses several complex "curing" systems.

All these issues are overcome in accordance with the present invention by the simple use of polymers and a dual curing/adhesion promoting system. The present invention overcomes these deficiencies with a simplified cross-linking system to prevent compression which occurs over a period of time and a grafting of silane type adhesion promoters onto the backbone of the Exxon polymers.

Also, in one embodiment of the present invention the present sealing system takes advantage of using a liquid silane compound and a liquid cross-linking agent, both of which facilitate the ease of incorporating these materials into the elastomer matrix to provide a far more homogeneous product.

SUMMARY OF THE INVENTION

It is, therefore, an object of the present invention to provide a composition adapted for use as a sealing strip in the manufacture of insulating structures. The composition includes a polymeric base material(s), a cross linking agent, an adhesion promoter, fillers, molecular sieves and plasticizers and less than 10% by weight tackifier.

It is also an object of the present invention to provide a composition wherein the cross linking agent is chosen from the group consisting of divalent metal oxides, divalent salts of organic fatty acids, organic fatty acids, zinc oxide, zinc stearate, stearic acid, zinc octoate (solution and solid), tin octoate and calcium stearate.

It is a further object of the present invention to provide a composition wherein the cross linking agent is zinc octoate in solution.

It is another object of the present invention to provide a composition wherein the adhesion promoter is chosen from the group consisting of organopolysiloxanes, organosilanes, organoaminosilanes, epoxysilanes, thiosilanes, organosilanols, alkoxysilanes, acetoxysilanes, and ketoxysilanes.

It is yet another object of the present invention to provide a composition wherein the adhesion promoter is an organoaminosilane.

It is still a further object of the present invention to provide a composition wherein the tackifier is chosen from the group consisting of organic monomers, oligomers and polymers, hydrogenated C5 and C9 resins, C5 hydrogenated resins, polyterpene resins, pentaerythritol esters of hydrogenated wood resins, phenolic polyterpene resins, alpha pinene resins, dipentene resins, hydrogenated C5 esters, cycloalkene resins, phenol-aldehyde resins, rosin acids and esters, dipentene resins, petroleum hydrocarbon resins and alkyl aromatic hydrocarbon resins.

It is also an object of the present invention to provide a composition further including one or more fillers.

It is also another object of the present invention to provide a composition wherein the polymeric base material includes compounds comprising polyisobutylene/polyisoprene copolymers, polyisobutylene polymers, brominated olefin polymers, copolymers of polisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, and styrene butadiene polymers.

It is a further object of the present invention to provide an insulating glass structure including a first pane, a second pane and a sealing strip as discussed above positioned between the first pane and the second pane.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
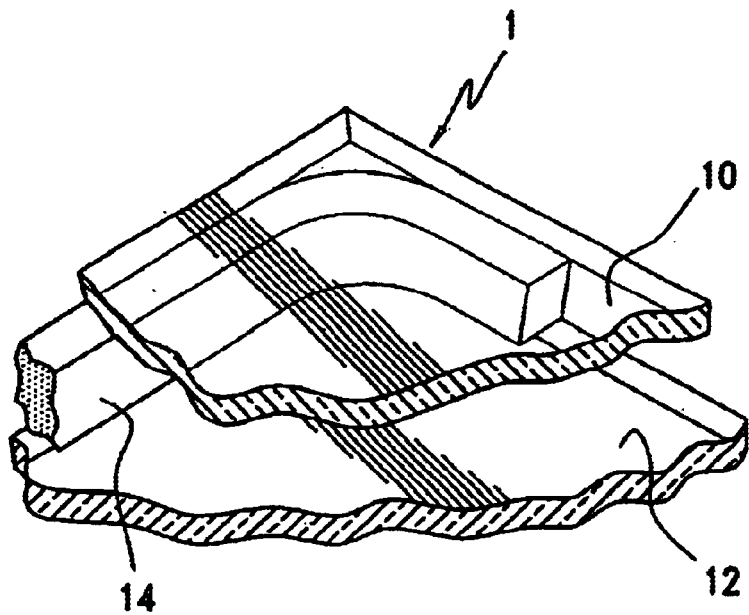
FIG. 1 is a partial perspective view of a glass double pane structure in accordance with the present invention.
Figure 2:
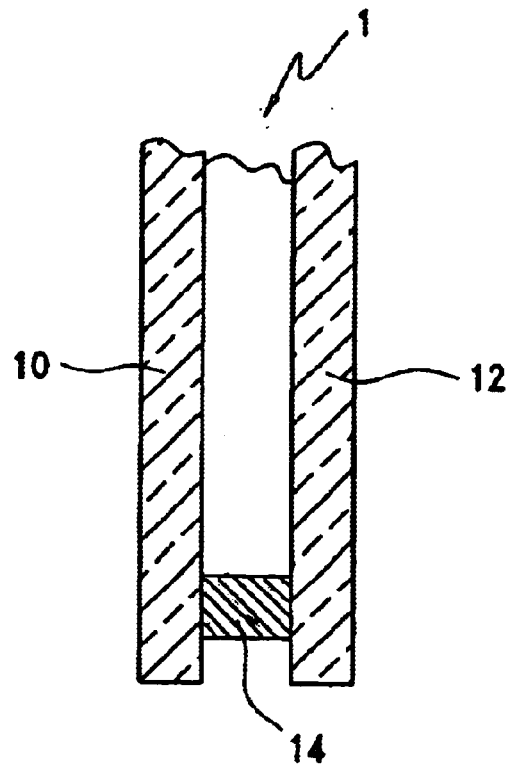
FIG. 2 is a cross sectional view of a glass double pane structure in accordance with the present invention.

With reference to FIGS. 1 and 2, an insulating glass structure 1 incorporating a sealing strip 14 providing separation of adjacent panes 10, 12 and sealing of the space therebetween is shown. As those skilled in the art will readily appreciate, the inventive concepts of the present sealing strip 14 may be applied in various manners without departing from the spirit of the present invention. For example, it is contemplated that the present sealing strip may be used in conjunction with other materials, for example, various types of glass, including, clear float glass, annealed glass, tempered glass, solar glass, tinted glass, and Low-E glass, acrylic sheets and polycarbonate sheets.

In accordance with the present invention, the sealing strip 14 is applied in the construction of a double pane glass structure. The insulating glass structure, therefore, generally includes a first pane 10 and a second pane 12 separated by a sealing strip 14 positioned between the first pane 10 and the second pane 12. The use of a sealing strip 14 in accordance with the present invention provides improved adhesion, vapor barrier characteristics and compression resistant characteristics. As a result, the present sealing strip 14 may be readily formed and applied without the need for supplemental vapor barriers and spacers commonly found in prior art sealing devices.

Vapor barriers are generally used in prior art devices when the sealant system does not have a good moisture vapor transmission rate, that is, it allows moisture to travel through the sealant at a rate that would allow too much moisture into the air space between the panes causing condensation between the panes. These vapor barriers may also be used as mechanical spacers to maintain a certain thickness of airspace in the window. The present sealing strip offers excellent moisture vapor transmission rates. In addition, the rheology of the composition is such that due to internal cross linking of the materials, the sealing strip will withstand attempts for compression and it will maintain the air space with no additional help from a supplemental vapor barrier spacer. The theoretical cross linking agent in accordance with a preferred embodiment of the present invention is disclosed below

A

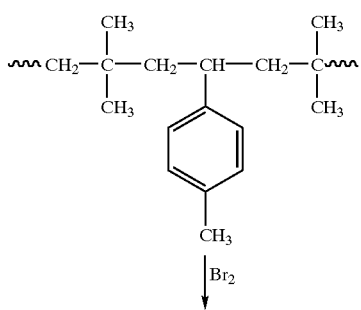

-continued

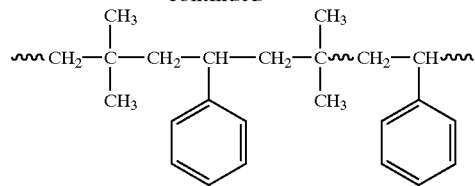

EXXPRO POLYMER (STARTING MATERIAL

B

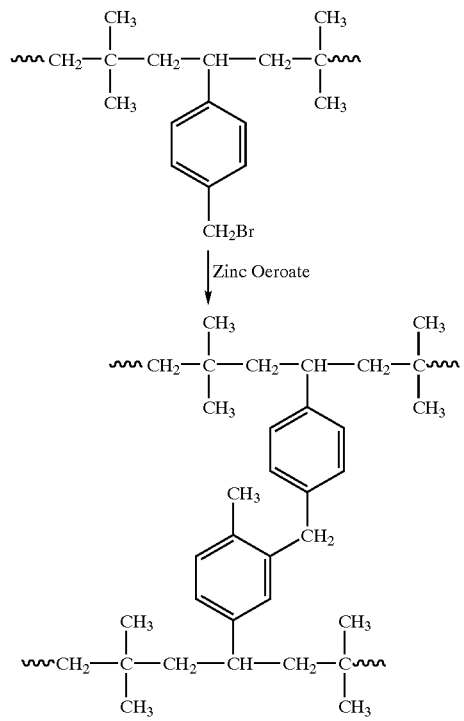

The preferred material prepared by the use of both the silane adhesion promoter and the cross linking agent provides the unique property which allows only minimal compression set when put under constant stress due to the cross linking of the material. If one uses too great a quantity of either material, one can get less than 0.001 inch of compression set. However, this makes the material very tough and almost impossible to handle. In addition, when such material is used to manufacture an insulating glass unit the adhesion to glass is reduced. It is only through the unique combination of the correct amount of silane and cross linking agents that one is capable of obtaining a material which is handable, gives good adhesion and resists compression set.

In addition, this reinforcing can be further enhanced by the use of appropriate fillers as seen in the formulation. This allows the formulator a third alternate in controlling the resistance to compression.

When put under a constant pressure of 30 pounds per square inch for weeks at a time, the compression set is less than 0.030 inch.

The sealing strip in accordance with the present invention is generally composed of a polymeric base material, a cross linking agent, an adhesion promoter, plasticizers (or oils or diluents), fillers, molecular sieves and less than 10% by weight tackifier. The use of a cross linking agent and adhesion promoter in combination with less than 10% tackifier by weight results in a sealing strip offering improved compression and adhesion characteristics. This allows the sealing strip to be used in the fabrication of insulating glass structures without the need for additional spacers and vapor barriers.

In accordance with a preferred embodiment of the present invention, the polymeric base material comprises greater than approximately 10%, preferably approximately 15–40%, and most preferably approximately 15–25%, by weight of the sealing strip composition. The polymeric base material is composed of compounds comprising polyisobutylene/polyisoprene copolymers (e.g., Exxon Butyl), polyisobutylene polymers (e.g. Exxon Vistanex), brominated olefin polymers (e.g., Exxon Exxpro) and petroleum hydrocarbon oil.

The cross linking agent comprises approximately 0.25–5.00% by weight, and preferably, approximately 0.50–1.50% by weight, of the sealing strip composition. The cross linking agent is chosen from the group consisting of divalent metal oxides, divalent salts of organic fatty acids, organic fatty acids, zinc oxide, zinc stearate, stearic acid, zinc octoate (solution and/or solid), tin octoate and calcium stearate.

Where zinc oxide is used it usually needs accelerators such as sulfur compounds and complex vulcanization systems. While specific accelerators are disclosed above in accordance with a preferred embodiment of the present invention, there are many other known accelerator systems which may be used in accordance with the present invention. The salts of calcium, tin and zinc used in accordance with the present invention also require accelerator systems.

In accordance with a preferred embodiment of the present invention, and as discussed below with reference to the various examples presented, zinc octoate solution is a preferred cross linking agent for use in accordance with the present invention. In addition, it has been found that approximately a 17–19% zinc octoate solution works better than 100% solid zinc octoate in accordance with preferred embodiments of the present invention. While the use of accelerators is described above with reference to a preferred embodiment of the present invention, those skilled in the art will appreciate that the present invention may be practiced without the use of accelerators.

The adhesion promoter comprises approximately 0.25–7.00% by weight, and preferably approximately 0.50–1.50% by weight, of the sealing strip composition. The adhesion promoter is chosen from the group consisting of organopolysiloxanes, organosilanes, aminosilanes, epoxysilanes, thiosilanes, organosilanols, alkoxysilanes, aceotoxysilanes, organoaminosilanes and ketoxysilanes, specifically, such as, vinyltriethoxy silane, methyltris (isopropenoxy)silane, (N,N-Dimethyl-3-aminopropyl) silane, gamma-glycidoxy-propyltrimethoxysilane, polydimethylsiloxane, and N-beta-(aminoethyl)-gamma-aminopropyltrimethoxysilane. In accordance with a preferred embodiment of the present invention, and as discussed below with reference to the various examples presented, organoaminosilane is a preferred adhesion promoter for use in accordance with the present invention.

As briefly mention above, the tackifier forms less than 10% by weight of the sealing strip composition. The tackifier is chosen from the group consisting of organic monomers, oligomers and polymers, hydrogenated C5 and C9 resins, C5 hydrogenated resins, polyterpene resins, pentaerythritol esters of hydrogenated wood resins, phenolic polyterpene resins, alpha pinene resins, dipentene resins, hydrogenated C5 esters, cycloalkene resins, phenolaldehyde resins, rosin acids and esters, dipentene resins, petroleum hydrocarbon resins, and alkyl aromatic hydrocarbon resins. Preferred tackifiers include pentaerythritol esters of hydrogenated wood rosin and hydrogenated C5 hydrocarbons. The C5 hydrogenated hydrocarbon resin may be used alone or in combination with the pentaerytlritol hydrogenated esters. These tackifiers can be used individually or in combination and can also be used as is or with a diluent, hydrocarbon oil or plasticizer. In accordance with a preferred embodiment of the present invention, and as discussed below with reference to the various examples presented, C5 hydrogenated resins are a preferred tackifier for use in accordance with the present invention.

In accordance with variations on the composition described above, it has been found that the replacement of molecular sieves with talc, or other inert fillers, results in a class of compounds generally referred to as hot melt adhesives. Such adhesive may also be used as an insulating glass sealant in a traditional aluminum spacer bar system with the same positional results described above.

As to the other components of such a hot melt adhesive, the tackifier would remain substantially as with the sealing strip composition discussed above. In addition, the tackifier will be kept to less than 10% as disclosed above with regard to the sealing strip composition.

In forming an insulated glass unit, it is contemplated that the hot melt adhesive would be applied to a metallic spacer at approximately 250° F. Once assembled, it is contemplated that the hot melt adhesive will provide adhesion properties and moisture vapor transmission rates substantially similar to those offered by the sealing strip composition discussed above. The hot melt adhesive will also resist compression (but since it proposed for use with a spacer this is not a critical issue).

EXAMPLES

The sealing strip composition is formed in the following manner:

Equipment

The equipment is generally referred to as a double arm horizontal sigma mixer. It can have variable speed and needs an external source of heat to control the temperature. It uses a jacket so hot water, steam or cold water can be run through the jacket to control the internal temperature. It can be vacuum rated but it is not necessary.

Procedure

The following is a general procedure. The times and temperatures can vary somewhat depending on the size of the batch and the mixer used. As an example, it will take somewhat longer per addition for larger batches. If the temperature is lower than normal it will take longer to mix in. None of these are deleterious to the final product.

All ingredients are weighed out beforehand except the molecular sieves and the organo silane. They are weighed out just before use (otherwise both materials may pick up moisture from the atmosphere). The mixer is heated to approximately 225–250 degrees Fahrenheit (F.), the mixer is turned on and the masterbatch is added over a 10 minute period (the temperature is maintained between 225–250 degrees F. either by the use of the external heating mechanism or by heat of mixing when each ingredient is added).

The tackifiers are added one by one over a 5–15 minute period. These are preferably solid pellet or flake type materials which will melt in the mix at these temperatures. Mixing is continued until all tackifiers are melted and homogeneous. The hydrocarbon oil and filler are added alternately while maintaining a mix which is neither too thick and dry or too moist and wet. This can take 15–30 minutes and mixing is continued for 5–15 minutes after all the material is added. At this point the molecular sieves are added in 5–15 minutes and mixing is continued for an additional 15 minutes. These materials are white in color in comparison to the black material in the mixer so one can identify when the material is adequately mixed in.

The temperature is taken periodically either by a temperature probe built into the mixer or by turning the mixer off after taking the temperature with an external thermometer.

After the molecular sieves are added, the material is cooled to 200 degrees F. before the silane and zinc octoate are added. After the silane and zinc octoate are added, it is mixed 30 minutes, the mixing blades are stopped and the material is removed.

Lap Shear Adhesion/Durometer Readings

Extensive studies of the adhesion of products manufactured in accordance with the present invention have been carried out by the Lap Shear Method, ASTM C-961 87 (reapproved 1992). As a reference point, several competitive butyl based sealant strips and hot melt products were tested in the marketplace and results were obtained in the range of 12–20 pounds per square inch (psi). Durometer readings are a way to measure the relative internal strength and resistance to compression. With the proper formulation, the adhesion could be optimized and maximized while obtaining a handable material that still had flexibility but did not flow or take a compression set.

Based on the concentration of the silane and the zinc octoate, the resistance to compression can be controlled by optimizing the cross-linking concentration with the zinc octoate and by maximizing the adhesion by optimizing the concentration of the silane. We have been able to obtain adhesion values between 30–80 psi and can control the adhesion in the desired range by employing the method in accordance with the present invention.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An insulating structure, comprising:
   a first pane;
   a second pane; and
   a sealing strip characterized by improved compression resistance and low moisture vapor transmission rates whereby no spacer or moisture vapor barrier is present therein, said sealing strip positioned between the first pane and the second pane, the sealing strip composition including:
   a polymeric base material including in combination compounds chosen from the group consisting of polyisobutylene polymers, polyisobutylene copolymers, brominated olefin terpolymers, butyl rubber copolymers and styrene butadiene copolymers;
   a cross linking agent chosen from the group consisting of, divalent salts of organic fatty acids, zinc stearate, zinc octoate, tin octoate and calcium stearate;
   an adhesion promotor, and
   a tackifier.

2. The insulating structure according to claim 1, wherein the cross linking agent is zinc octoate.

3. The insulating structure according to claim 1, wherein the adhesion promoter is chosen from the group consisting of organopolysiloxanes, organosilanes, organoaminosilanes, epoxysilanes, thiosilanes, organosilanols, alkoxysilanes, acetoxysilanes and ketoxysilanes.

4. The insulating structure according to claim 1, wherein the adhesion promoter is chosen from the group consisting of vinyltriethoxy silane, methyltris(isopropenoxy)silane, (N,N-Dimethyl-3-aminopropyl) silane, gamma-glycidoxypropyltrimethoxysilane, polydimethylsiloxane and N-beta-(aminoethyl)-gamma-aminopropyltrimethoxysilane.

5. The insulating structure according to claim 1, wherein the adhesion promoter is organoaminosilane.

6. The insulating structure according to claim 1, wherein the tackifier is chosen from the group consisting of organic monomers, oligomers and polymers of hydrogenated resins, hydrogenated resins, polyterpene resins, pentaerythritol esters of hydrogenated wood resins, phenolic polyterpene resins, alpha pinene resins, dipentene resins, hydrogenated esters, cycloalkene resins, phenol-aldehyde resins, rosin acids and esters, dipentene resins, petroleum hydrocarbon resins and alkyl aromatic hydrocarbon resins.

7. The insulating structure according to claim 1, wherein the tackifier is hydrogenated resins.

8. The insulating structure according to claim 7, wherein the adhesion promoter is chosen from the group consisting of organopolysiloxanes, organoaminosilanes, aminosilanes, epoxysilanes, thiosilanes, organosilanols, alkoxysilanes, acetoxysilanes and ketoxysilanes.

9. The insulating structure according to claim 1, wherein the sealing strip composition further includes a filler, a molecular sieve and a plasticizer.

10. The insulating structure according to claim 1, wherein the polymeric base material is polyisobutylene-co-p-bromomethyl styrene terpolymer.

11. a first pane;
    a second pane; and
    a sealing strip characterized by improved compression resistance and low moisture vapor transmission rates whereby no spacer or moisture vapor barrier is present therein, said sealing strip positioned between the first pane and the second pane, the sealing strip composition including:
    a polymeric base material including in combination compounds chosen from the group consisting of polyisobutylene polymers, polyisobutylene copolymeres, brominated olefin terpolymers, butyl rubber copolymers and styrene butadiene copolymeres;
    a cross linking agent chosen from the group consisting of, divalent salts of organic acids, zinc stearate, zinc octoate and calcium stearate;
    an adhesion promotor, and
    a tackifier.

12. The polyolefin copolymer of claim 11 consisting of polyisobutylene copolymer.

13. The bominated olefin terpolymer of claim 11 consisting of polyisobutylene-co-p-bromomethyl styrene terpolymer.

14. The cross linking agent of claim 11 consisting of zinc octoate.

* * * * *